Feb. 5, 1957 A. P. STEC 2,780,688
GRAVITATIONAL SWITCH

Filed June 16, 1954 2 Sheets-Sheet 1

Anthony Peter Stec
INVENTOR.

BY *Clarence A. O'Brien*
*and Harvey B. Jacobson*
Attorneys

Feb. 5, 1957 A. P. STEC 2,780,688
GRAVITATIONAL SWITCH
Filed June 16, 1954 2 Sheets-Sheet 2
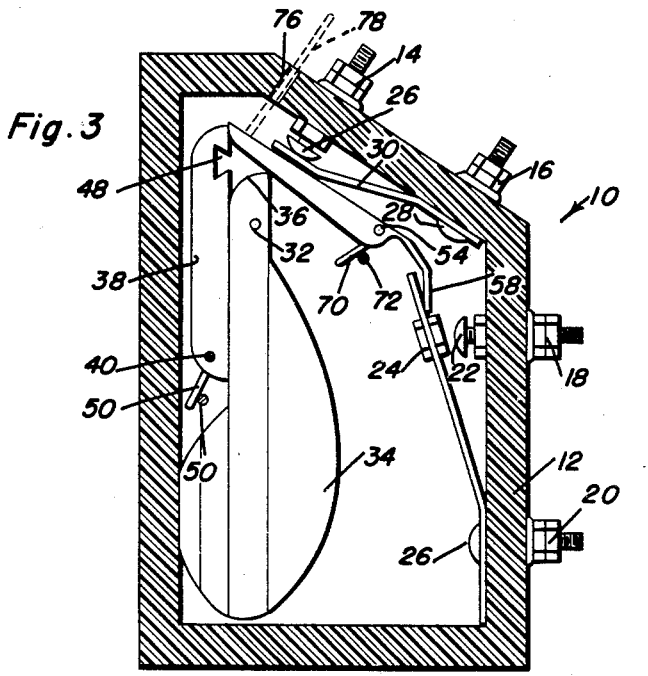
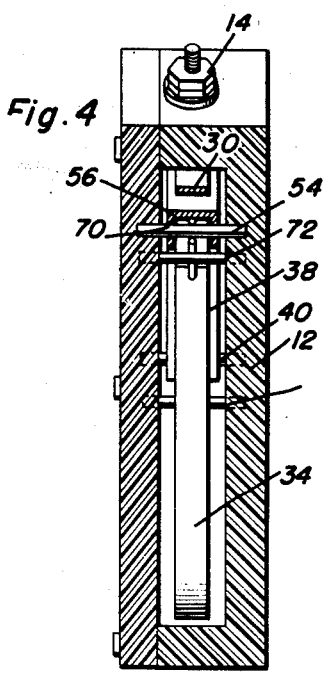
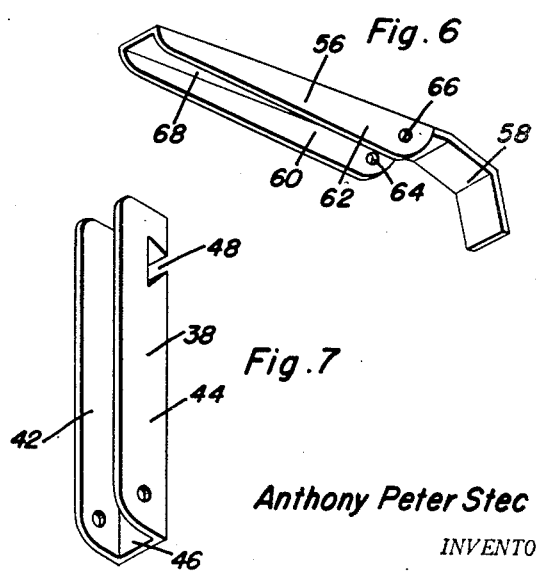
Anthony Peter Stec
INVENTOR.

United States Patent Office 2,780,688
Patented Feb. 5, 1957

2,780,688

GRAVITATIONAL SWITCH

Anthony Peter Stec, Kenosha, Wis., assignor to Mary Ann Stec, Kenosha, Wis.

Application June 16, 1954, Serial No. 437,133

2 Claims. (Cl. 200—61.52)

This invention relates to an attachment for a vehicle and more particularly to a gravity actuated switch for use in conjunction with farm tractors and like vehicles as a safety device.

The primary object of this invention resides in the provision of means to automatically open the electrical distribution system of the internal combustion engine of a vehicle so that continued operation of the vehicle is impossible where the vehicle is tilted to a dangerous degree when subsequent operation may render the vehicle completely unstable and likely to overturn.

When installed in a vehicle having an automatic transmission, this switch functions as a safety device. If the operator of the vehicle accidentally steps on the accelerator pedal instead of brake pedal from a dead stand still, the sudden surge forward of the vehicle with switch mounted rigid forces the switch to disengage due to the retarded speed of pendulum. With normal acceleration the switch will not disengage. Applying brake when the vehicle has forward motion has no effect on switch but applying brakes too quickly in reverse motion again acts as a safety device, thereby discontinuing electrical contact with distributor.

A further object of this invention resides in the provision of a switch which cannot be reset except by intentional actuation and depression of the operating lever of the switch.

The construction of this invention features a pendulum actuated latch which releases a lever so as to close contacts connected to the magneto of the internal combustion engine of the vehicle while opening the distributor circuit.

Still further objects and features of this invention reside in the provision of a gravity operated switch that is strong and durable, simple in construction and manufacture, which may be installed at various angles so as to cause the switch to be activated when the vehicle approaches the limit of its stability dependent on the particular characteristics of the vehicle on which the switch is mounted, and which is constructed from readily available materials at a relatively low cost.

These, together with the various ancillary objects and features which will become apparent as the following description proceeds, are attained by this switch, a preferred embodiment of which has been illustrated in the accompanying drawings, by way of example only, wherein:

Figure 3 is another vertical sectional view showing the switch again in an upright position prior to resetting;

Figure 4 is a vertical sectional view as taken along the plane of line 4—4 in Figure 1;

Figure 6 is a perspective view of the operating lever; and

Figure 7 is a perspective view of the latch.

Figure 1:
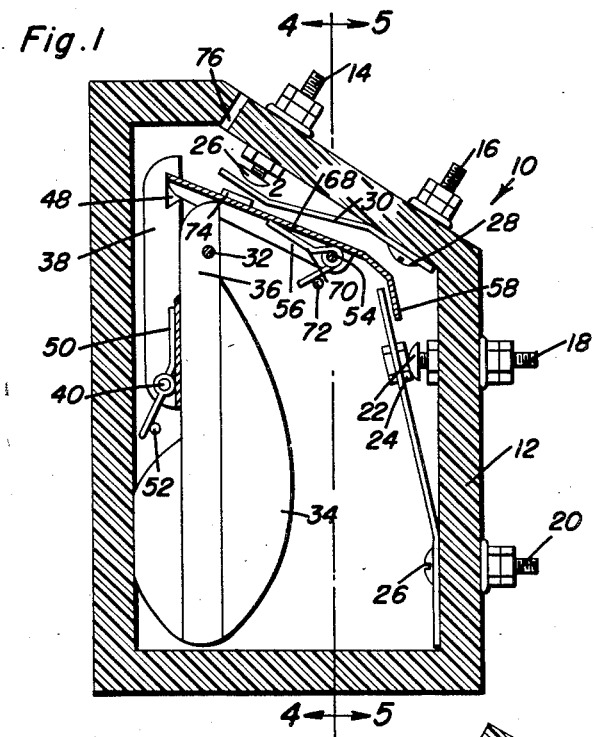
Figure 1 is a vertical sectional view of the switch shown in an upright position.
Figure 5:
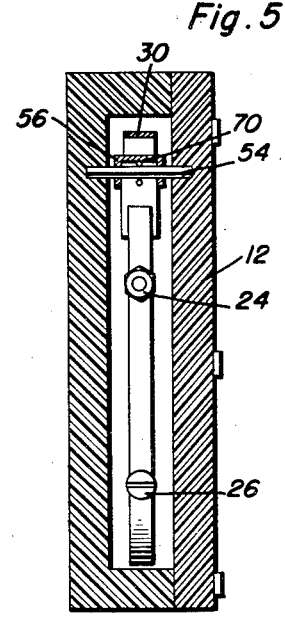
Figure 5 is a vertical sectional view as taken along the plane of line 5—5 in Figure 1.

With continuing reference to the accompanying drawings wherein like reference numerals designate similar parts throughout the various views, reference numeral 10 generally designates the gravitational switch comprising the present invention. The switch 10 is adapted to be mounted on a tractor or like vehicle in order to prevent further operation of the vehicle should the vehicle become tilted to a dangerous angle. It is to be recognized that the switch itself can be adjusted so as to operate at a predetermined angle and can also be fastened by any suitable means to the vehicle at a predetermined angle which taking into account the angle of tilt at which the switch will become actuated can be elected so as to permit maximum of flexibility of operation of the vehicle before the operation of the vehicle will be interrupted by operation of the switch.

The switch 10 includes a housing 12 of any suitable material such as a laminated phenolic resin or any other suitable material which is preferably of electrically insulative characteristics. Mounted on the housing 12 are terminals 14, 16, 18 and 20. The terminals are adapted to be connected by electrical conductors, not shown, to the magneto and distributor of the internal combustion engine, such as the diesel engines of tractors and other agricultural equipment. It is to be recognized, however, that this gravitational switch can be utilized in conjunction with practically any type of vehicle.

Adjustably mounted in conjunction with the terminal 18 by means of a threaded member is a fixed contact 22. Movable contact 24 of resilient characteristics is held in position normally in engagement with the contact 22 by means of the fastener 26 which may form part of the terminal 20.

The threaded member 26 forming a portion of the terminal member also forms a fixed contact within the housing 12 and the fastener 28 forming a portion of terminal 16 holds a resilient contact 30 spaced from and normally disengaged from the contact 26.

Pivotally mounted on a pin 32 is a weighted pendulum 34 having a cam surface, as at 36, adapted to engage a latch 38 which is pivotally mounted as at 40. The latch 38, whose construction can be best seen in Figure 7, is generally of channel-shape having flanges 42 and 44 interconnected by a connecting portion 46. A recess 48 which is of generally dovetailed shape is provided in the latch 38 and suitable vertical walls define the opening 48.

Mounted on the pin which is the pivot mounting, as at 40, for the latch 38, is a spring 50 one end of which engages the cross portion 46 of the latch 38 with the other end of the spring 50 engaging the pin 52. The spring 50 therefore urges the latch 38 to rotate in a generally clockwise direction when looking at the switch as in Figure 1.

Pivotally mounted on pin 54 in the housing 12 is an operating lever 56. The operating lever includes an angularly bent end portion 58 adapted to engage the resilient contact 24 and is further provided with downwardly extending flanges 60 and 62 having apertures, as at 64 and 66, through which the pin 54 extends. The flanges 60 and 62 are interconnected by an upper connecting portion 68. A spring 70 is mounted about the pin 54 and has one end portion engaging the upper cross portion 68 while the other end of the spring 70 resiliently engages pin 72. The operating lever 56 carries a projection 74 for engagement with the resilient contact 30 to urge the resilient contact into engagement with the fixed contact 26. The end portion of the operating lever 56 is adapted to seat within the dovetail recess 48 in the latch 38.

Figure 2:
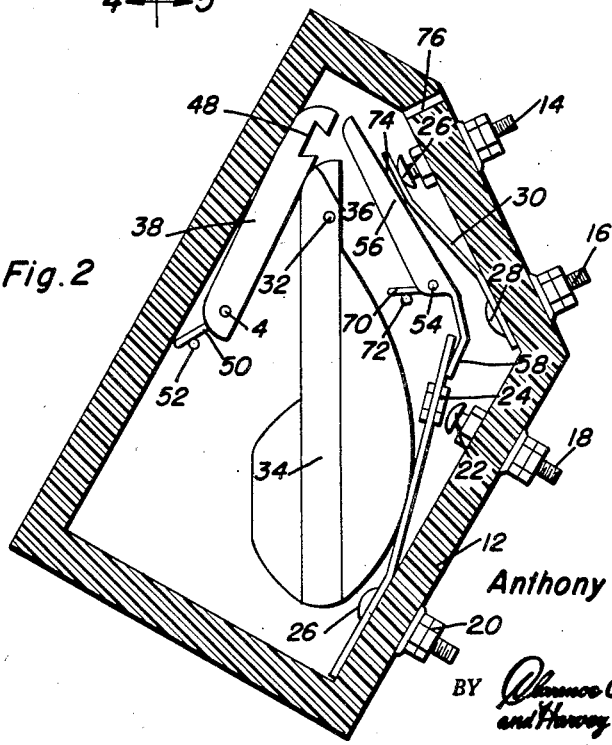
Figure 2 is a vertical sectional view similar to that of Figure 1 but showing the switch after it has been tilted to be actuated by the pendulum.

The operation of the gravitational switch is quite simple. With the switch in a set position as is shown in Figure 1, tilting of the vehicle on which the switch is mounted will cause the pendulum to pivot the latch 36 in a counter-clockwise direction as is seen in Figure 2 to release the operating lever 56. The spring 70 will then cause the operating lever 56 to engage the movable contact 30 with the fixed contact 26 while disengaging the movable contact 24 from the fixed contact 22. It is impossible to accidentally reset the gravitational switch when the vehicle returns to a more normal position due to the operation of the spring 70. However, an aperture 76 is formed in the housing 12 through which a suitable tool 78 can be inserted to depress the operating lever 56 by pressing the springs 50 and 70 thus engaging the operating lever 56 in the recess 48.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A gravity actuated switch comprising a housing, a pendulum pivotally mounted in said housing, a first fixed contact in said housing, a first resilient movable contact normally engaging said first fixed contact, a second fixed contact in said housing, a second resilient movable contact normally spaced from said second fixed contact, an operating lever pivotally attached to said housing, resilient means continuously urging said lever to pivot, a latch pivotally attached to said housing engageable with said lever to hold said lever against pivoting, said pendulum engaging said latch to disengage said latch from said lever to allow said lever to pivot to disengage said first movable contact from said first fixed contact and engage said second movable contact with said second fixed contact, and resilient means continuously urging said latch to engage said lever, said latch being of substantially channel shape and having a dovetail shaped slot therein, said lever having end portion engageable in said slot, said housing having an aperture therethrough in alignment with said lever through which a resetting tool can be inserted for engagement with said lever for resetting said lever in said slot in said latch while storing energy in said resilient means urging said lever and said resilient means urging said latch.

2. A gravity actuated switch comprising a housing, a pendulum pivotally mounted in said housing, a first fixed contact in said housing, a first resilient movable contact normally engaging said first fixed contact, a second fixed contact in said housing, a second resilient movable contact normally spaced from said second fixed contact, an operating lever pivotally attached to said housing, resilient means continuously urging said lever to pivot, a latch pivotally attached to said housing engageable with said lever to hold said lever against pivoting, said pendulum engaging said latch to disengage said latch from said lever to allow said lever to pivot to disengage said first movable contact from said first fixed contact and engage said second movable contact with said second fixed contact, and resilient means continuously urging said latch to engage said lever, said latch being of substantially channel shape and having a dovetail shaped slot therein, said lever having end portion engageable in said slot, said housing having an aperture therethrough in alignment with said lever through which a resetting tool can be inserted for engagement with said lever for resetting said lever in said slot in said latch while storing energy in said resilient means urging said lever and said resilient means urging said latch, said pendulum having a cam shaped portion engageable with said latch to pivot said latch.

References Cited in the file of this patent

UNITED STATES PATENTS

| | | |
|---|---|---|
| 1,901,554 | De Wilde | Mar. 14, 1933 |
| 2,130,706 | Salmond | Sept. 20, 1938 |
| 2,171,457 | Schuyler | Aug. 29, 1939 |
| 2,206,067 | Waltamath | July 2, 1940 |
| 2,313,549 | Hormain | Mar. 9, 1943 |